(12) United States Patent
Reyes

(10) Patent No.: US 11,987,295 B2
(45) Date of Patent: May 21, 2024

(54) MODULAR VEHICLE MOUNTED RACK SYSTEM

(71) Applicant: XTRUSION DESIGNS LLC, Wichita, KS (US)

(72) Inventor: Alan Reyes, Andover, KS (US)

(73) Assignee: XTRUSION DESIGNS LLC, Wichita, KS (US)

( * ) Notice: Subject to any disclaimer, the term of this patent is extended or adjusted under 35 U.S.C. 154(b) by 240 days.

(21) Appl. No.: 17/574,086

(22) Filed: Jan. 12, 2022

(65) Prior Publication Data

US 2022/0219765 A1 Jul. 14, 2022

Related U.S. Application Data

(60) Provisional application No. 63/136,516, filed on Jan. 12, 2021.

(51) Int. Cl.
*B60R 9/00* (2006.01)
*B60S 1/62* (2006.01)
*B62D 33/04* (2006.01)

(52) U.S. Cl.
CPC ............... *B62D 33/04* (2013.01); *B60S 1/62* (2013.01)

(58) Field of Classification Search
CPC ....... B60R 9/00; B60R 2011/004; B60R 9/06; B60R 9/058; F16B 2012/505; F16B 2012/443; B62D 33/0207; B60P 7/0815; B60P 3/40
USPC .......................................................... 224/405
See application file for complete search history.

(56) References Cited

U.S. PATENT DOCUMENTS

| | | | | |
|---|---|---|---|---|
| 3,513,606 A | * | 5/1970 | Jones | F16B 12/34 52/27 |
| 5,682,719 A | * | 11/1997 | Huang | A47G 5/00 52/775 |
| 5,752,636 A | * | 5/1998 | Manley | B60P 3/40 224/511 |
| 7,464,977 B1 | * | 12/2008 | Price | B60P 3/40 296/26.05 |
| 9,440,520 B2 | | 9/2016 | Rohr et al. | |
| 9,580,004 B2 | * | 2/2017 | Puchkoff | B60P 7/0815 |
| 9,586,629 B2 | | 3/2017 | Leitner | |
| 10,549,700 B2 | | 2/2020 | Yaffe et al. | |
| 10,865,602 B1 | * | 12/2020 | Varshavsky | E06C 7/04 |
| 10,940,803 B2 | * | 3/2021 | Ni | B60R 9/058 |
| 11,124,127 B2 | * | 9/2021 | Cotton | B60K 15/035 |

(Continued)

*Primary Examiner* — Adam J Waggenspack
(74) *Attorney, Agent, or Firm* — AVEK IP, LLC

(57) ABSTRACT

A vehicle rack system includes elongate structural members coupled together to form a rack for use on or within a vehicle's cargo area. At least one of the elongate structural members has an elongate pressure tight lumen for holding a fluid therein, and a nozzle allows the fluid to enter and exit the lumen. A vehicle having a rack system includes a vehicle and a plurality of elongate structural members removably coupled together to form a rack removably coupled to the vehicle. A first of the members has a longitudinal slot between and behind a pair of flanges. An anchor is positioned in the slot, and the anchor is irremovable from the slot while the system is at an assembled configuration. The anchor is removable from the slot while the system is at unassembled configuration. The anchor is used to secure the first member to a second of the members.

20 Claims, 19 Drawing Sheets

(56) References Cited

U.S. PATENT DOCUMENTS

2006/0273121 A1* 12/2006 Thomas .................. B60R 9/058
224/322
2008/0100075 A1* 5/2008 Derecktor ................ B60P 3/40
296/3
2016/0059906 A1* 3/2016 Leitner .................... B60R 9/00
296/3

* cited by examiner

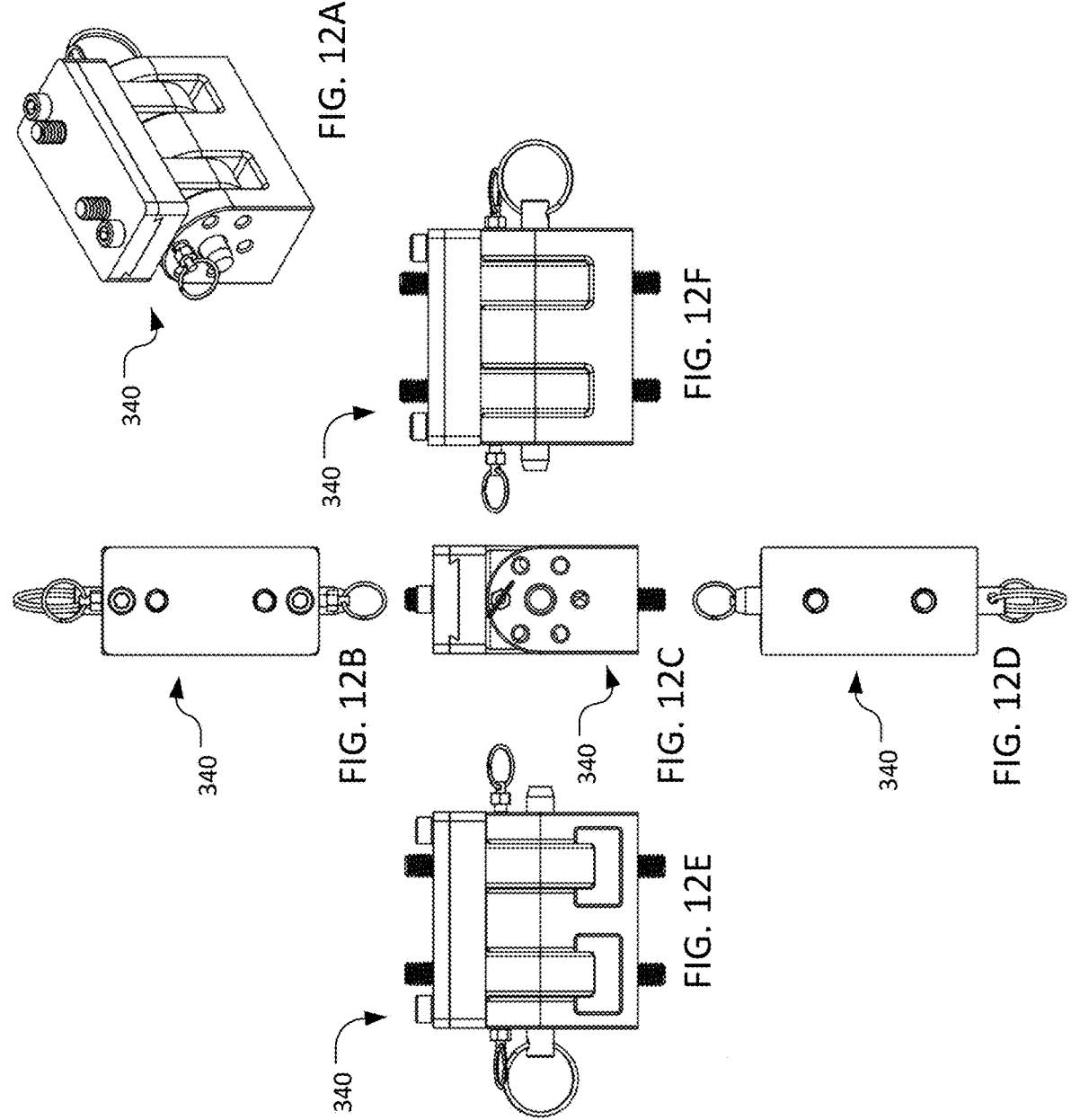

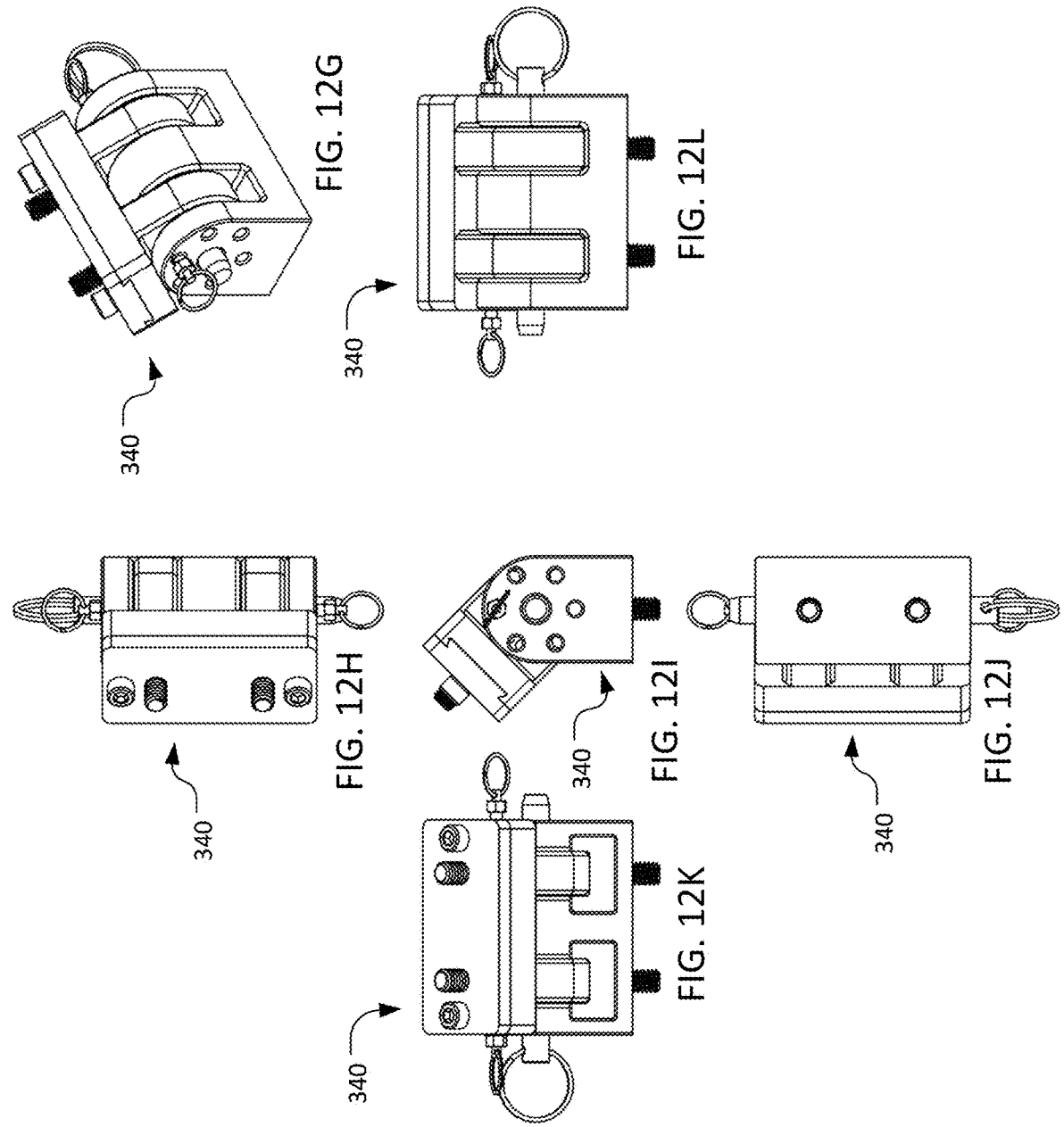

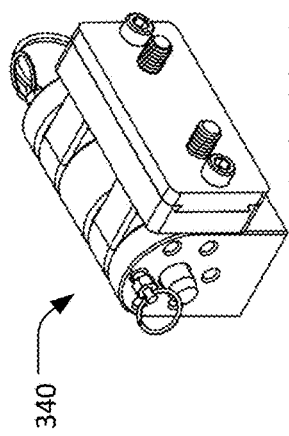
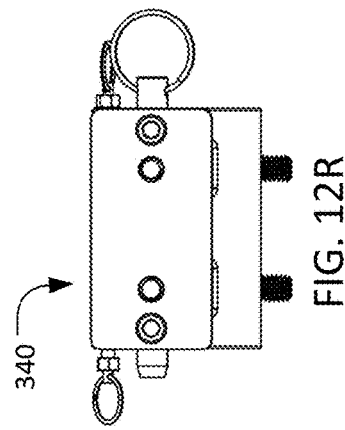
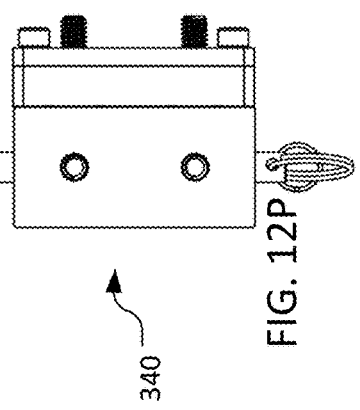
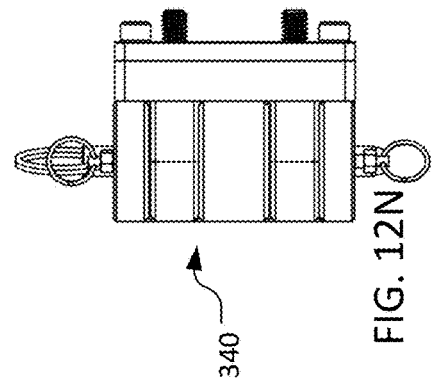
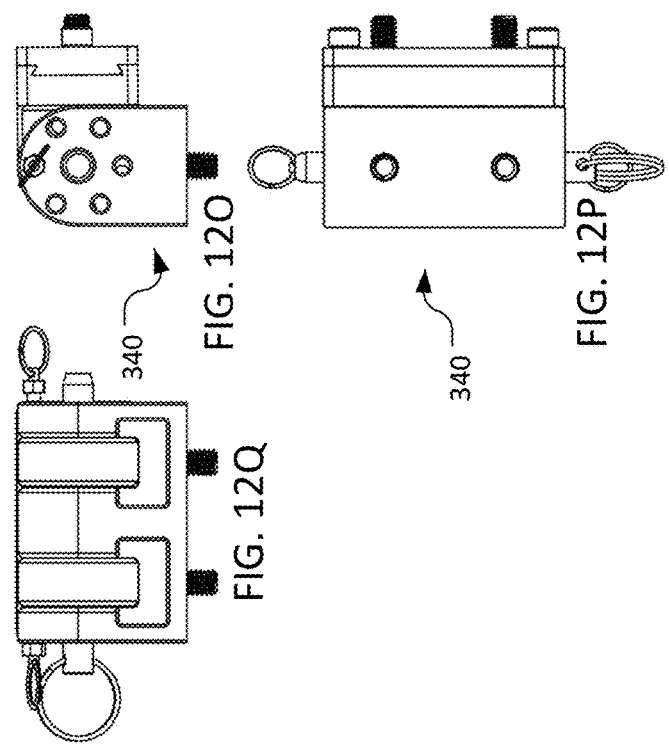

MODULAR VEHICLE MOUNTED RACK SYSTEM

CROSS REFERENCE TO RELATED APPLICATIONS

This application claims priority to U.S. Provisional Patent Application, Ser. No. 63/136,516 filed Jan. 12, 2021, the disclosure of which is incorporated by reference herein in its entirety.

FIELD OF THE DISCLOSURE

The disclosure relates generally to the field of vehicle mounted cargo and accessory support systems. Specifically, the disclosure relates to user configurable racks for mounting to a vehicle bed.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to an embodiment, a vehicle rack system includes a first column, a crossbar, a first bracket assembly, a second column, a second bracket assembly, and an anchor. The first column has a first end and a second end, and the first end of the first column is operably coupled to the vehicle. The crossbar has a first end and a second end. The first bracket assembly couples the second end of the first column to the first end of the crossbar. The first bracket assembly has a first fastener passing into the first column through the second end of the first column, and the first bracket assembly has a second fastener passing into the crossbar through the first end of the crossbar. The second column has a first end and a second end, and the first end of the second column is operably coupled to the vehicle. The second bracket assembly couples the second end of the second column to the second end of the crossbar. At least one item selected from the group consisting of the first column, the second column, and the crossbar includes a longitudinal slot between and behind a pair of flanges. The anchor is positioned in one of the longitudinal slots and is irremovable from the longitudinal slot while the system is at an assembled configuration. The anchor is removable from the longitudinal slot while the system is at an unassembled configuration.

According to another embodiment, a vehicle rack system includes a plurality of elongate structural members coupled together to form a rack for use on or within a cargo area of a vehicle. At least one of the elongate structural members has an elongate pressure tight lumen for holding a fluid therein, and a nozzle allows the fluid to enter and exit the lumen.

According to still another embodiment, a vehicle having a rack system includes a vehicle and a plurality of elongate structural members removably coupled together to form a rack. The rack is removably coupled to the vehicle, and a first of the elongate structural members has a longitudinal slot between and behind a pair of flanges. A first anchor is positioned in the longitudinal slot of the first elongate structural member, and the first anchor is irremovable from the longitudinal slot of the first elongate structural member while the system is at an assembled configuration. The first anchor is removable from the longitudinal slot of the first elongate structural member while the system is at unassembled configuration. The first anchor is used to secure the first elongate structural member to a second of the elongate structural members.

BRIEF DESCRIPTION OF THE DRAWINGS

Illustrative embodiments of the present disclosure are described in detail below with reference to the attached drawing figures.

FIGS. 12A-12F illustrate various views of a hinge joint of the rack system of FIG. 1, according to an embodiment of the present disclosure.

FIGS. 12G-12L illustrate various views of a hinge joint of the rack system of FIG. 12A, in an alternate configuration.

FIGS. 12M-12R illustrate various views of a hinge joint of the rack system of FIG. 12A, in another alternate configuration.

DETAILED DESCRIPTION

Figure 1:
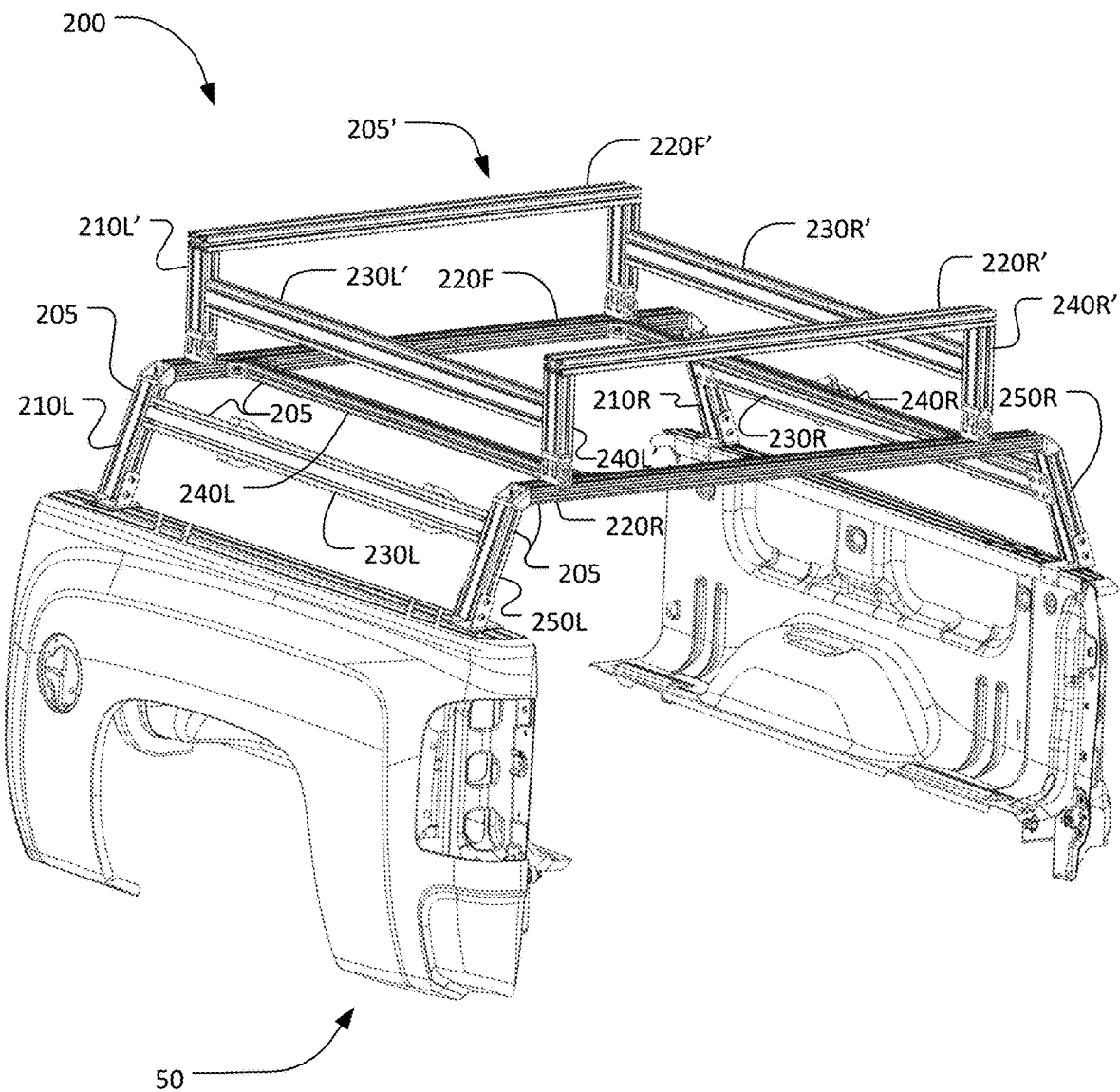
FIG. 1 is a perspective view of a rack system secured to a truck bed, according to an embodiment of the present disclosure.

Conventional vehicle cargo areas, such as pickup truck beds and the like, provide usable but finite cargo space. Most vehicles are only provided with original equipment manufacturer (OEM) devices such as tie-downs mounted on a cargo area side and/or top rail to assist with securing cargo. These cargo areas are also limited in terms of the type of cargo they can safely carry. Users of these vehicles often want to carry a variety of items, some of which are not amenable to simply placing in the bed and/or attaching to a provided tie-down. The items to be carried sometimes require specialized accessory racks to prevent unwanted item displacement and/or damage during travel. Conventional solutions for these problems tend to focus on cargo racks such as vehicle roof panels. These solutions are generally inflexible and inconvenient for the user. Moreover, placing items on a vehicle roof can significantly increase the vehicle height. This can create issues when passing into/through structures with low overhangs, such as parking garages and residence garage entryways, and it can compromise vehicle aerodynamics and fuel efficiency.

Some prior art aftermarket truck bed racks utilize several vertical or substantially vertical supports on each side of the truck bed. Laterally-extending beams (or "crossbars") extend between upper ends of at least some of the opposing pairs of vertical supports. In some cases, longitudinally-extending beams extend along the upper ends of the vertical supports. The beams are typically placed slightly above a height of the roof of the truck cab so that items can be supported above the roof line. However, these configurations are generally unable to accommodate taller items, such as motorcycles, in the truck bed. Because the beams of the conventional bed racks are made integrally with each other and/or the truck bed (e.g., via welding), they cannot be removed without removal of the entire rack. These types of truck bed racks are intended to be permanent and are not easily removed or modified. As a result, they are quite inflexible. Examples of these prior art support rack configurations are shown in U.S. Pat. No. 9,440,520 (Rohr et al), U.S. Pat. No. 9,586,629 (Leitner), and U.S. Pat. No. 10,549,700 (Leff Yaffe et al).

There is a need for a user-friendly system which overcomes these or other issues, such as a system which is relatively more adjustable and/or configurable, while also being relatively more resistant to adverse forces experienced while the vehicle is in the field or on the move.

The modular and user-reconfigurable rack system of the present disclosure may allow the user to configure channeled members to create structures of different heights and lengths for cargo management and organization upon or within a vehicle. In some embodiments, the system may include sets of vertical framing members, horizontal framing members extending along the length of the truck bed, and horizontal framing members extending along the width of the truck bed. Each framing member may have an external profile with one or more longitudinal slot situated between and behind flange surfaces to provide anchor/clamping surfaces. Some or all of the framing members may be releasably secured with bracket members and/or reinforcing plates that may provide a rigid structural connection with the strength to withstand dynamic loads.

Embodiments of the system of the present disclosure may provide a series of hollow spaces (or "lumens") within one or more of the framing members. These lumens may provide internal chambers within which one or more fluids (i.e., liquid and/or gas) may be stored.

The resulting structure may be installed upon or within and affixed to a vehicle (e.g., to or within a bed of a pickup truck) and may be compatible with other components such as bed covers, "tonneau" covers, "soft toppers", caps, or hard tops. This may be accomplished with no permanent modifications to the original equipment of the vehicle. For example, embodiments of the present disclosure may be installed without the use of welding.

Accessories such as, but not limited to, cargo mounting points, modular plates, toolboxes, tie down rings, cargo pods, gas tanks, water tanks, roof top tents, bike carriers, kayak or canoe carriers, ladders, tools, axes, shovels, hi-lifts, spare tires, etc., can be modularly arranged along the channels of any of the frame members. The accessories may be arranged in a variety of directions, locations, and/or orientations, allowing the user to readily adjust or change the configuration of the disclosed system to better suit their needs.

The above and still further features and advantages of the present disclosure may become apparent upon consideration of the following detailed description of various embodiments thereof, particularly in light of the accompanying drawings, wherein like reference numerals in the various figures are utilized to designate like components.

FIGS. 1 through 13D illustrate an embodiment 200 of a modular vehicle mounted cargo and accessory support system (or "rack system") which may be user installable and configurable. The rack system 200 may allow the user to configure channeled members to create structures of different heights and lengths for cargo management and organization upon and/or within a vehicle (e.g., upon or within a truck bed 50). The rack system 200 includes a plurality of supports 205, which may include one or more vertically arranged columns 210L, 210R, 250L, and 250R, one or more horizontal crossbars 220F and 220R arranged along the width of the truck bed 50, and one or more framing members 230L, 230R, 240L and 240R extending horizontally along the length of the truck bed 50. Each of these columns, crossbars, and framing members may be assembled together to form the rack system 200 as a structure that is selectively (i.e., removably) secured to the truck bed 50 via any appropriate fasteners (e.g., brackets and threaded bolts).

One or more of the supports 205 (e.g., component 210L, 210R, 220F, 220R, 230L, 230R, 240L, 240R, 250L, and/or 250R) may have one or more channels providing mounting points for accessories (e.g., cargo mounting points, modular plates, toolboxes, tie down rings, cargo pods, gas tanks, water tanks, roof top tents, bike carriers, kayak or canoe carriers, ladders, tools, axes, shovels, hi-lifts, spare tires, et cetera). In some embodiments, the supports 205 may have the profile shown in FIG. 10, and it may be particularly desirable for each of the supports 205 to have one or more channels. The supports 205 may be sold at a standardized length, and the end user may cut the supports 205 to desired lengths using a hand saw, power saw, or other appropriate tool. Or the supports 205 may be provided at varying lengths such that no cutting is necessary.

Figure 10:
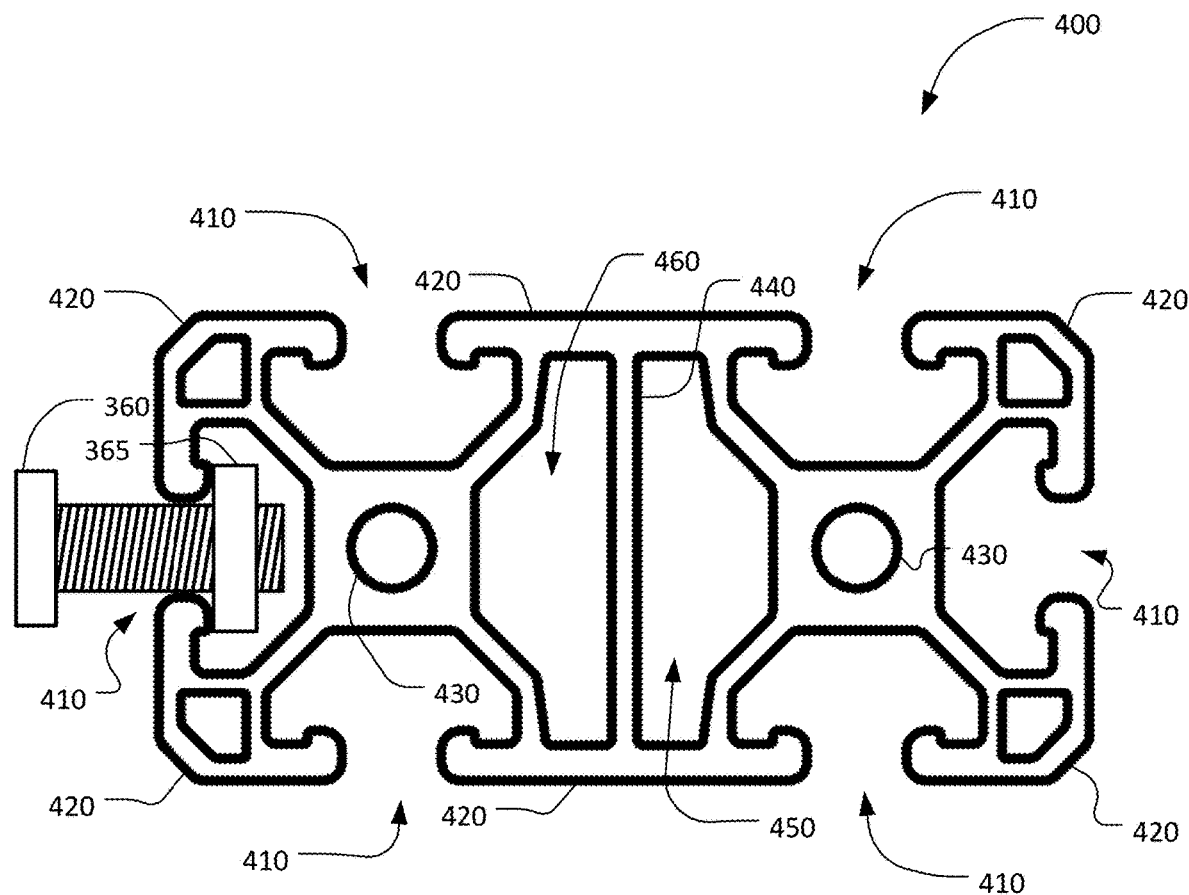
FIG. 10 is an end view of a support of the rack system of FIG. 1.

As shown in FIG. 10, one or more of the supports 205 may have a profile 400 with a plurality of continuous longitudinal slots (or "channels") 410 defined between and behind a plurality of flange projections 420. These channels 410 and flange projections 420 may work in conjunction to provide anchor or clamping surfaces (i.e., to act as mounting points for other supports 205, 205' and/or accessories). As such, many of the fasteners (e.g., threaded bolts) described herein may be selectively secured within this combination of channel 410 and flange 420. The supports 205 may also include one or more internally threaded bores 430. Additional features of the supports 205 and the profile 400 are discussed further below.

The system 200 may be selectively coupled to the vehicle (e.g., the truck bed 50) via one or more bedrail joint brackets 330L, 330R (FIGS. 2A and 3) and appropriate fasteners. The bedrail joint brackets 330L, 330R may include a main bracket 332, an adjustable backing plate 334, one or more fasteners 336, and a reinforcement plate 338. The main bracket 332 may be coupled to both a respective column 210L, 210R, 250L, or 250R (e.g., at an angle) and the adjustable backing plate 334. The user may tighten the fasteners 336 (e.g., one or more bolts) when the bedrail joint bracket is in the desired position, thus bringing the backing plate 334 closer to the main bracket 332. In this way, a portion of the truck bed 50 may be sandwiched between the backing plate 334 and the main bracket 332, effectively clamping the bedrail joint brackets 330L, 330R and their attached supports 205 to the vehicle. Each of these brackets 330L, 330R may be further braced by a reinforcement plate 338. The reinforcement plates 338 may have a notch 339 shaped to fit and abut the brackets 330L, 330R, which may strengthen the brackets 330L, 330R against transverse forces experienced thereon. The reinforcement plates 338 may be secured to the supports 205 by being releasably coupled to both a respective column 210L, 210R, 250L, 250R and one of the framing members 230L, 230R.

Figure 2A:
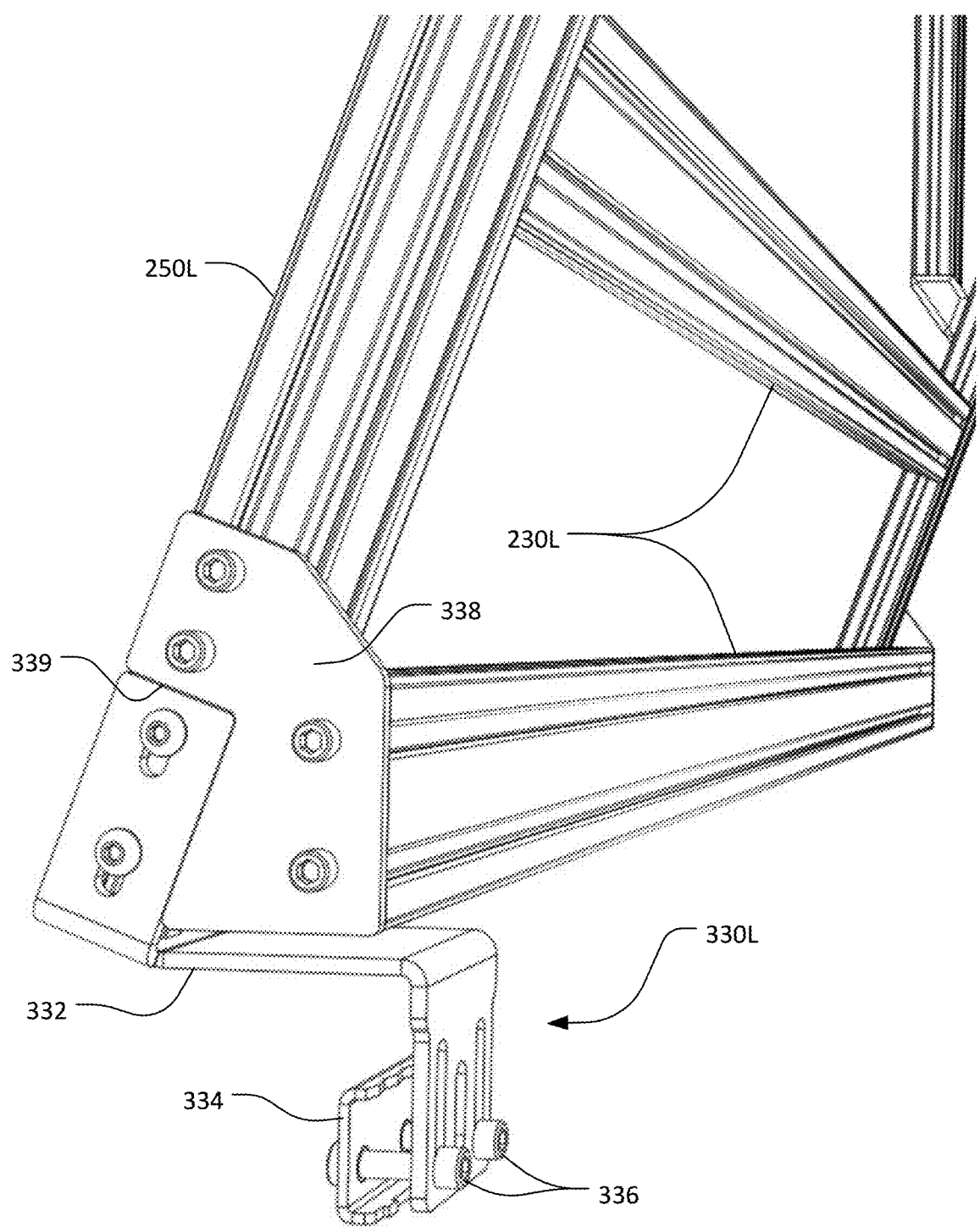
FIG. 2A is perspective view of a bedrail joint bracket of the rack system of FIG. 1, according to an embodiment of the present disclosure.
Figure 2B:
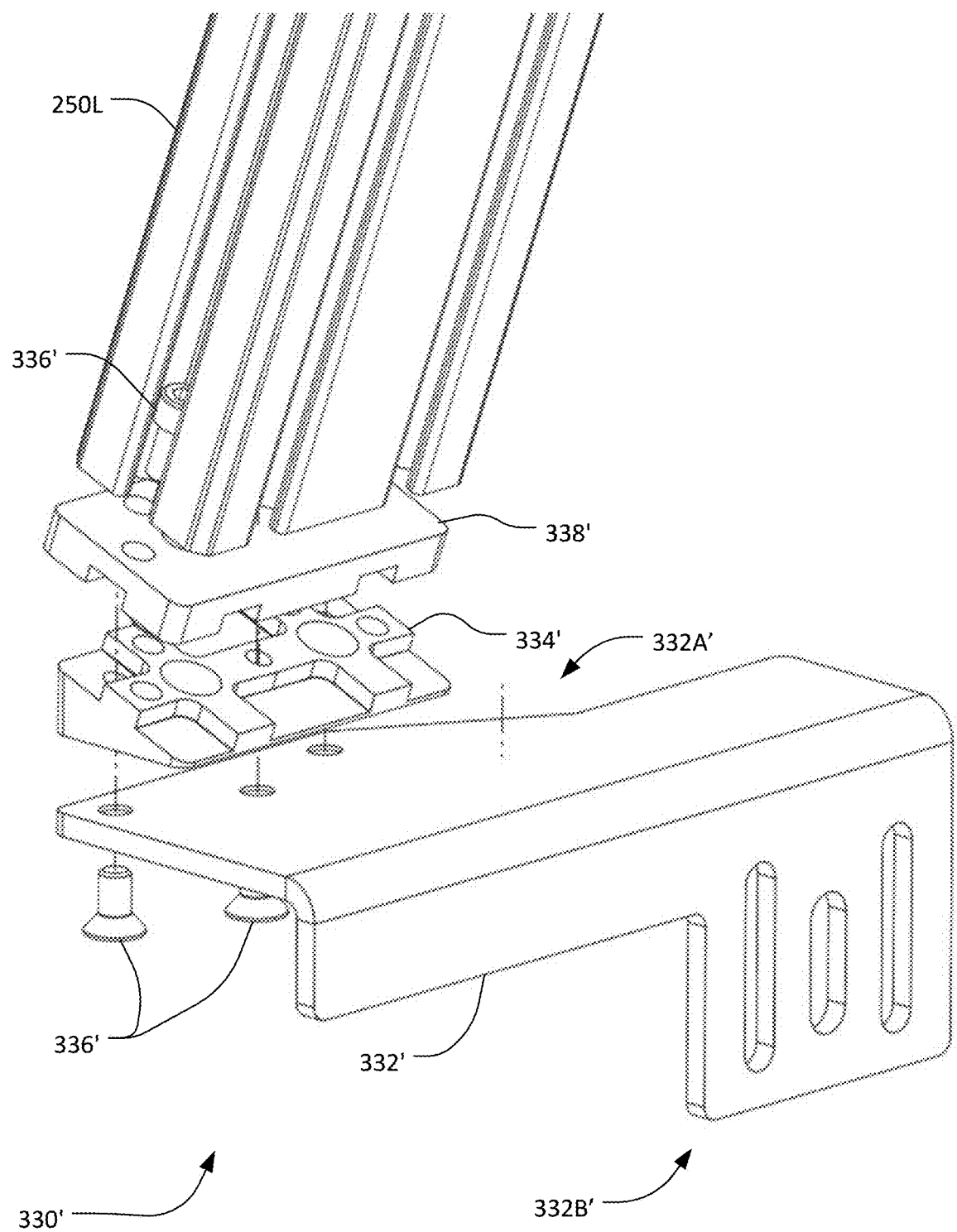
FIG. 2B is a perspective view of a bedrail joint bracket of the rack system of FIG. 1, according to another embodiment of the present disclosure.

In embodiments, an alternate or additional method of securing the system 200 to the vehicle bed 50 may include one or more bedrail brackets 330', as depicted in FIG. 2B. These bedrail brackets 330' may include a main bracket 332' having a column portion 332A' and a vehicle portion 332B', an angled plate 334', a plurality of fasteners 336', and a spacer 338'. The main bracket 332' may be secured (e.g., indirectly) to one of the columns 210L, 210R, 250L, 250R via apertures located in the column portion 332A', and secured (e.g., directly) to the vehicle bed 50 via apertures located in the vehicle portion 332B'. The angled plate 334' may be one of a plurality of angled plates 334' from which the user may select from when assembling the system 200. For example, the angled plate 334' may be a plate or other device which may allow the column 210L, 210R, 250L, or 250R to extend at an angle (e.g., ninety degrees, one-hundred-eighty degrees, forty-five degrees, thirty degrees, etc.) from the bracket 332' when coupled thereto.

It may be common for the user to cut or trim (e.g., with a hacksaw) portions of the system 200 (e.g., the supports 205, 205' thereof) to better fit their particular vehicle or cargo task needs. This may have the unintended effect of creating supports 205, 205' that have end portions which are not conducive to coupling together with other supports 205, 205' or the joints 300. As such, parts like the spacer 338' may be necessary to ensure a better coupling between the parts of the system 200. The spacer 338' may be a shim or other part which may provide a surface which may be flatter or more even than another support 205, 205' surface (e.g., a surface which is left uneven after being cut or trimmed. The spacer 338' may alternately or additionally serve the purpose of closing the gap between a support 205, 205' and a joint 300 when it is found that the dimensions of the support 205, 205' are slightly off. In this manner, one or more spacers 338' may be used to close the gap and ensure a better fit. Here, in FIG. 2B, the spacer 338' may be sandwiched between the angled plate 334' and the column 250L to complete the coupling therebetween. In some embodiments, one or more of the spacers 338' may be a gasket.

The system 200 may have additional joints 300 connecting and/or reinforcing the supports 205, 205'. For example, as detailed in FIGS. 3, 4A, and 4B, the system 200 may have one or more bracket members 310 that may couple (e.g., temporarily with fasteners such as bolts or screws) the vertical columns 210L, 210R, 250L, and 250R to respective crossbars 220F, 220R. In embodiments, the bracket members 310 may include one or more end plates, gaskets, or spacers 312 which function similarly to the above-described spacer 338'. That is, the end plates (or "gaskets" or "spacers") 312 may serve as a flat surface to interface with between the bracket and the supports 205, 205'. A user may also use one or more of the end plates 312 to change the effective length of a support 205, 205', which may be important in cases where a support 205, 205' is too short to reach a bracket member 310 or other joint 300. In still more embodiments, the end plates 312 may be configured to act as a seal to preclude the fluids stored within the profile 400 (as discussed further below) from undesirably leaking. The end plate 312 is further shown in FIGS. 13A-13D.

One or more of the various joints 300 of the system 200 may be strengthened with reinforcing plates 320 that may provide a rigid structural connection. The plates 320 may be selectively secured (e.g., via fasteners) to an associated bracket 310, column 210L, 210R, 250L, 250R, crossbar 220R, 220F, and/or framing member 230L, 230R, 240L, 240R. In some embodiments, the plates 320 have a seat 322 which accepts and supports a respective bracket 310. The plates 320 may also include additional tie-down points 324 for supporting one or more cargo ties. With these plates 320, the joints 300 may withstand relatively greater loads and forces, such as racking forces which may otherwise undesirably act upon the system 200, while providing further utility to the system 200.

Figure 5A:
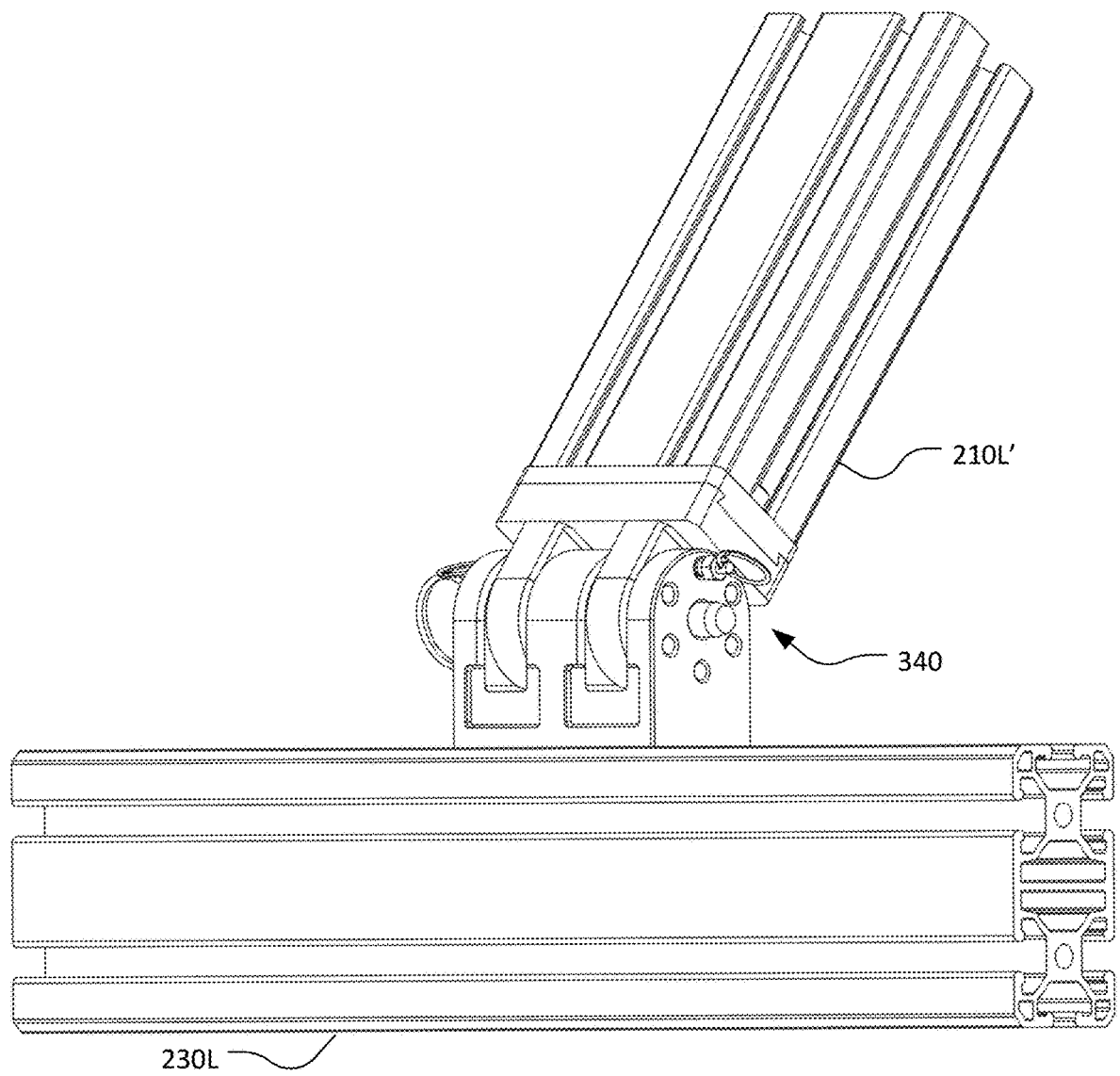
FIG. 5A is a perspective view of a hinged bracket of the rack system of FIG. 1.
Figure 5B:
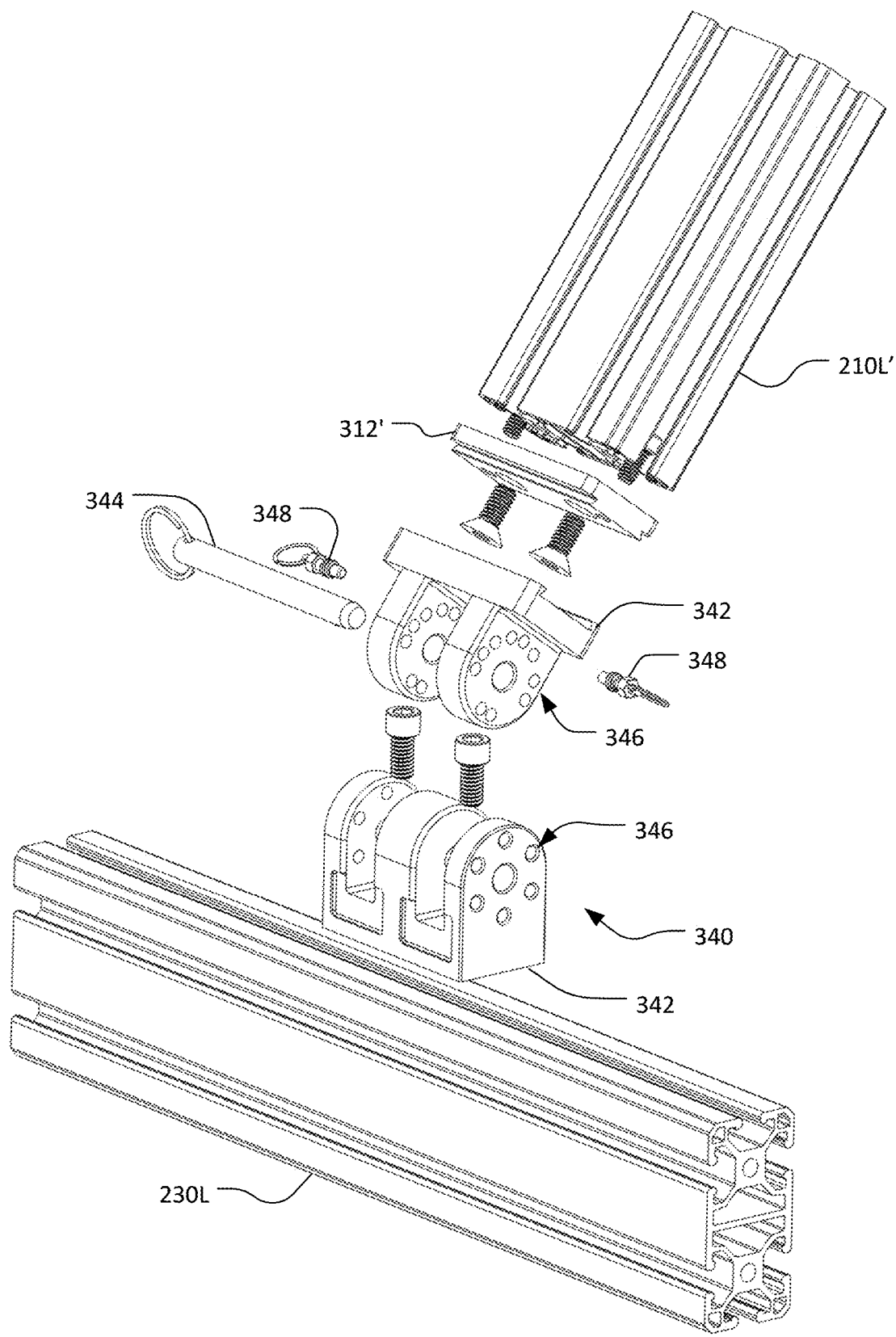
FIG. 5B is an exploded perspective view of the hinged bracket of FIG. 5A.

In embodiments, the joints 300 may alternately or additionally include hinged bracket 340 (FIGS. 5A and 5B). These hinged brackets 340 may include corresponding protrusions 342 which may rotate about an axle 344, each of these protrusions having a plurality of apertures 346. These apertures 346 may be arranged along the protrusions 342 at various desired angles, and one or more pins 348 may be used to hold the protrusions 342 in place. In this manner, the hinged brackets 340 may be readily adjusted to a desired angle. Embodiments of the hinged brackets 340 may have any suitable number and/or arrangement of apertures 346 as desired (e.g., one aperture every sixty degrees, one aperture every thirty degrees for a portion of the protrusion 342, et cetera). These hinged brackets 340 may utilize the channels of the supports 205 to releasably couple thereto, thus creating a system where a user may couple the brackets 340 in many different locations along the supports as desired. These hinged brackets 340 may increase the flexibility and customization of the system 200 by allowing the user to not only add supports 205 as desired at any location along the support 205 channels, but also at various angles to create a structure that suits the task at hand. In embodiments, the hinged joint 340 may include an end plate 312' (further shown in FIGS. 13A-13D), which is similar to the end plate 312 in function. The artisan would understand that the hinged brackets 340 may be substituted for any other joint 300 described herein as desired to create a connection that is adjustable (i.e., by modifying the angle thereof) by the user. The hinged joint 340 is further shown in FIGS. 12A-12R.

Figure 6:
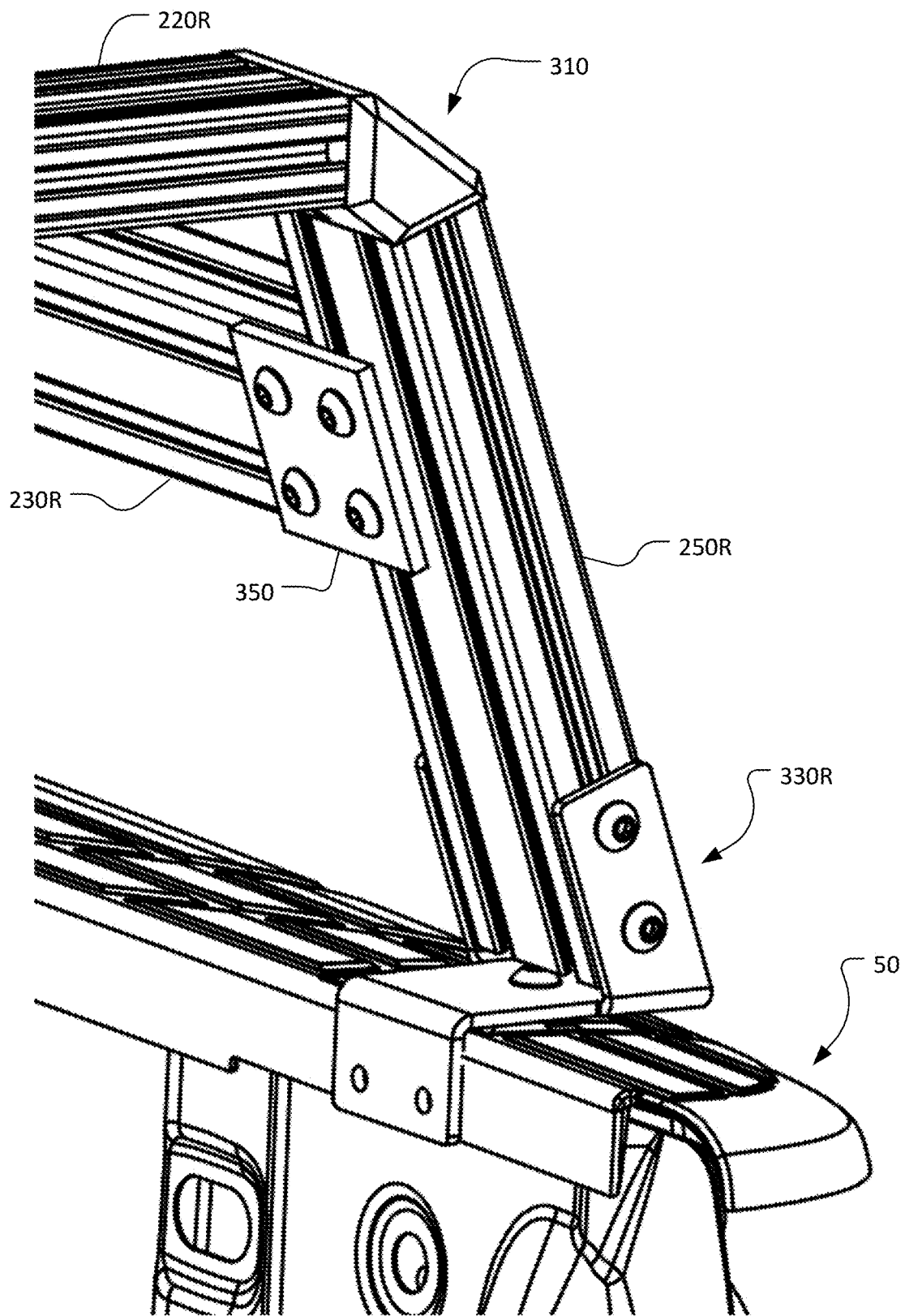
FIG. 6 is a perspective view of an attachment plate of the rack system of FIG.

Other forms of joints 300 may include attachment plates 350, such as that shown in FIG. 6. These attachment plates 350 may span two or more supports 205, 205' while having a plurality of apertures for receiving fasteners. The user may arrange one or more attachment plates 350 where the two or more supports 205, 205' meet and secure the plate 350 thereto. Thus, these two or more supports 205, 205' may be reliably coupled together and/or reinforced by the attachment plate 350. In FIG. 6, an attachment plate 350 is used to secure the framing member 230R to the column 250R.

Figure 7:
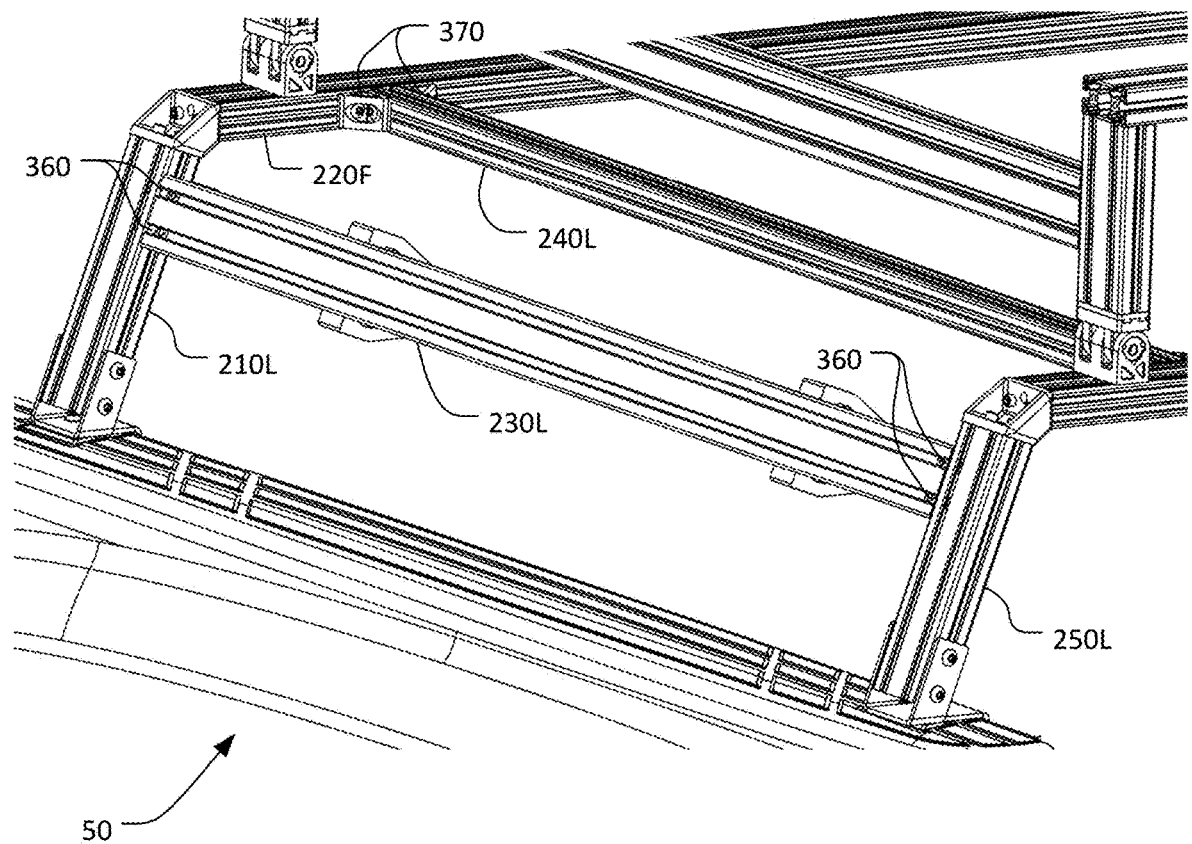
FIG. 7 is a perspective view of part of the rack system of FIG. 1.

FIG. 7 shows yet another example of joints 300 in the form of anchors 360 and braces 370. The anchors 360 may comprise fasteners such as threaded bolts which may allow any one support 205, 205' to couple to another support 205, 205' via the channels 410 and flanges 420 of the profile 400 and nuts 365 (FIG. 10). These mounting points or anchors 360 further allow a user to change the shape, size, and/or arrangement of the rack system 200 as desired. For example, the user may wish to change the exact location of the framing members 240L and 240R to make room for a tall object in the truck bed 50. Here, they may readily decouple the members 240L, 240R from the crossbars 220F, 220R, and recouple the members 240L, 240R thereto at a different location, or even remove the members 240L, 240R altogether. In embodiments, the anchors 360 may alternately or additionally be used to secure other accessories (e.g., tie down points, cargo pods, etc.) at a desirably location along the supports 205, 205'.

The braces 370 may comprise a square (or other) bracket with which fasteners may be used. Like the anchors 360, the braces 370 may facilitate coupling any one support 205, 205' to another. The braces 370 may differ therefrom by adding additional strength or reinforcement to the bond between the supports 205, 205' by resisting undesirable forces acting thereupon. Like the anchors 360, the braces 370 may be used to install and/or reinstall the supports 205, 205' at various locations along the other supports 205, 205'.

Figure 8:
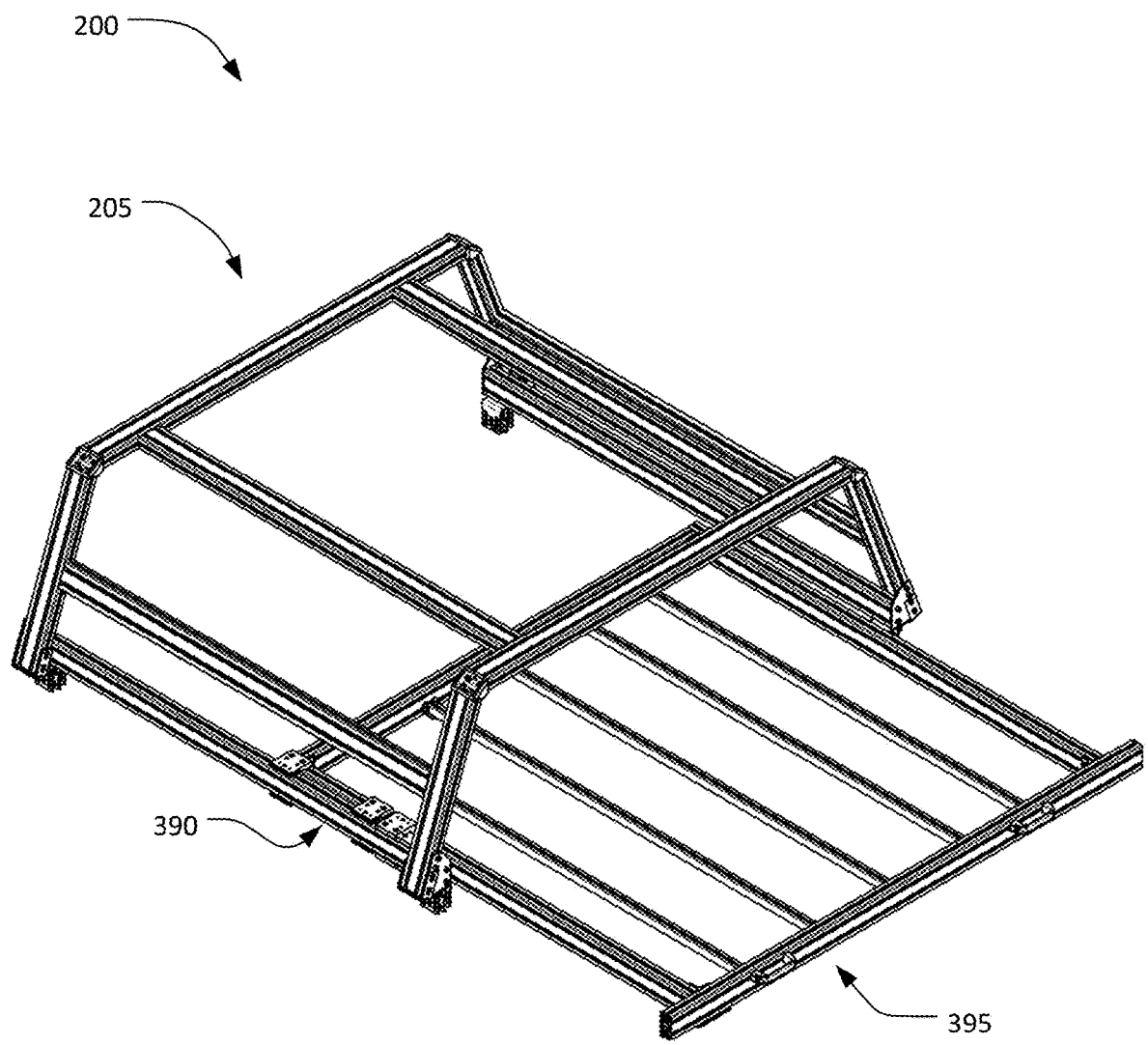
FIG. 8 is a perspective view of a slidable deck of the rack system of FIG. 1.

The rack system 200 can include additional user-installable plates, joints, and components to create substructures, such as a slidable deck area shown in FIG. 8 having a slide 390 and a deck 395. The deck 395 may selectively extend and retract from the slide 390 to change between a use configuration and a storage configuration, respectively. The artisan would recognize that the system 200 may include as many of the joints 300 as is desired, such that the user may reconfigure and adjust the system 200 to their needs. In some embodiments, one or more of the joints 300 are manufactured from 6061 billet aluminum.

Figure 3:
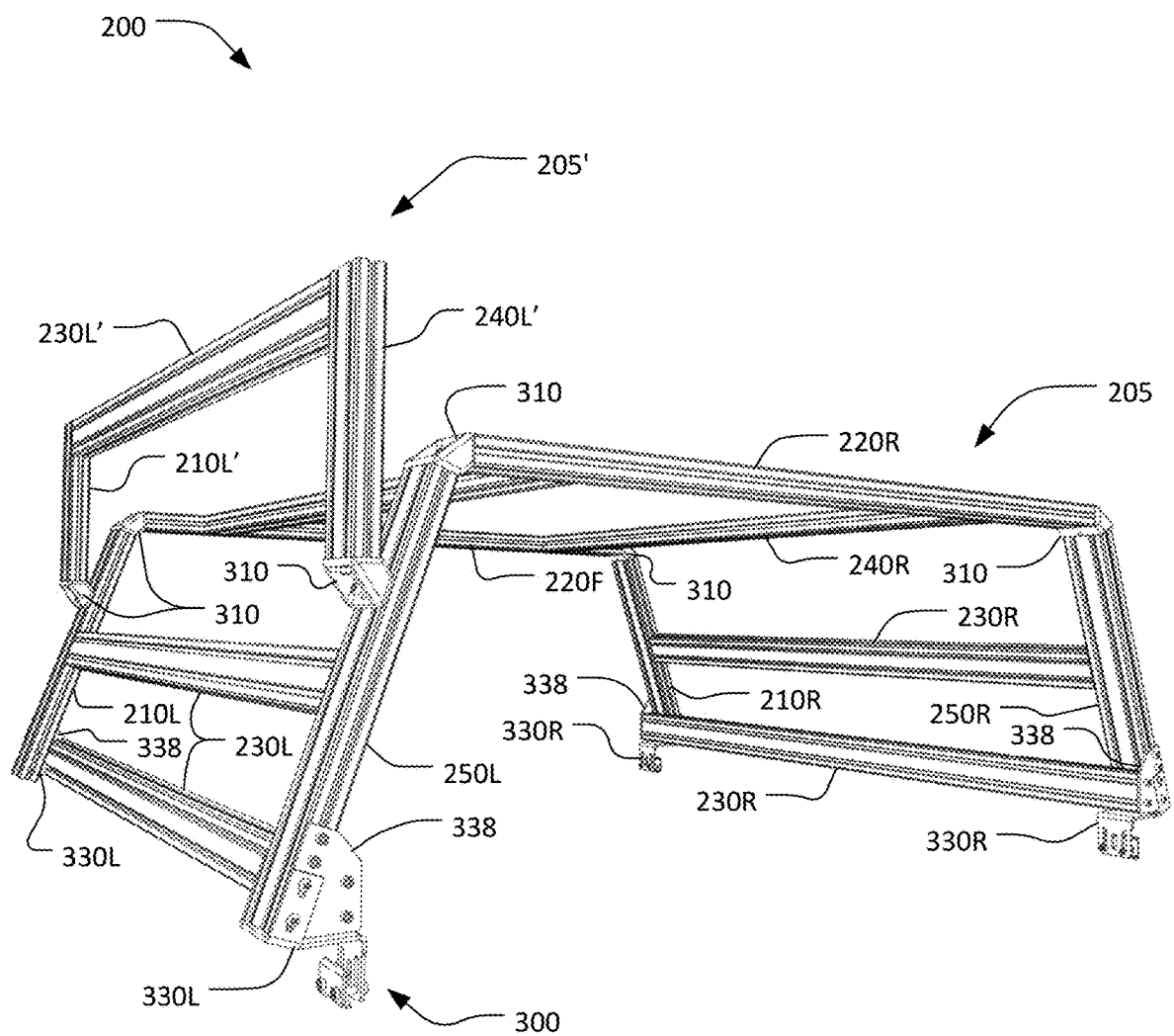
FIG. 3 is a perspective view of the rack system of FIG. 1, in an alternate arrangement.
Figure 4A:
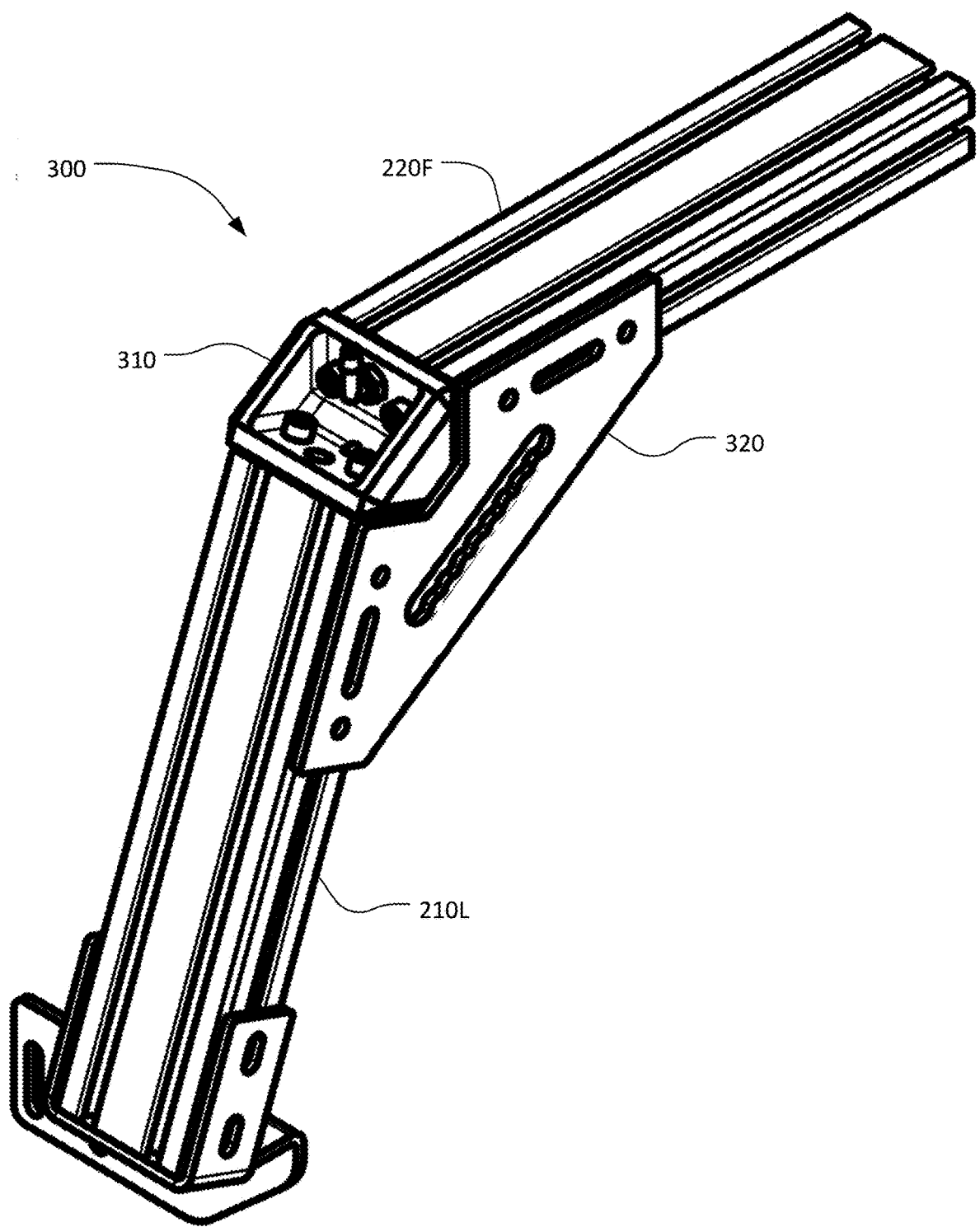
FIG. 4A is a perspective view of supports and joints of the rack system of FIG.
Figure 4B:
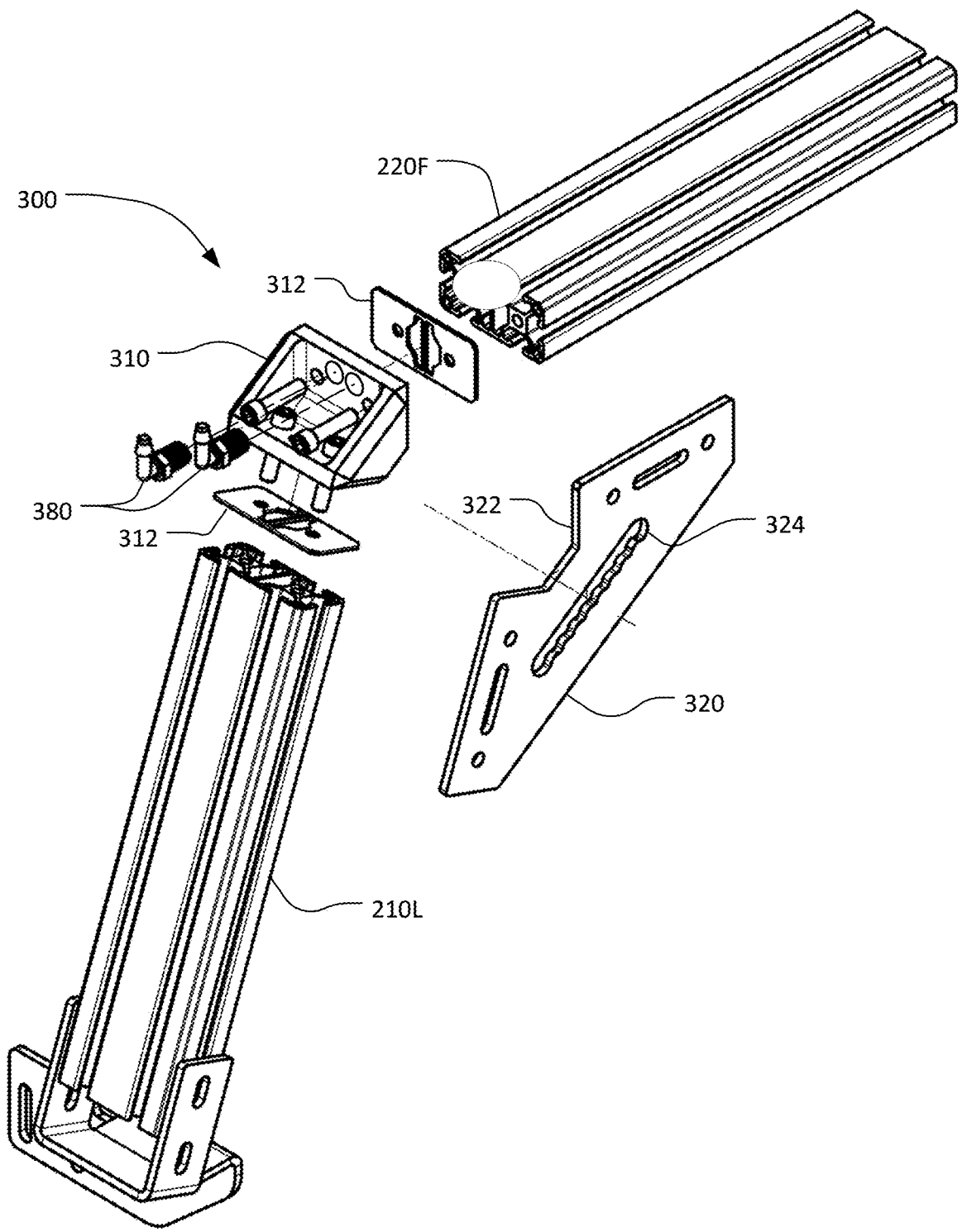
FIG. 4B is an exploded perspective view of FIG. 4A.

Other embodiments of substructures may include additional supports 205' (that are substantially similar in form/function to the supports 205) and/or hinged components that may allow for dynamic cargo placement, such as on top of other cargo. For example, as seen in FIGS. 1 and 3, a second set of columns 210L', 210R', 240L', 240R', crossbars 220F', 220R', and framing members 230L', 230R' may be joined to the first set of supports 205 via one or more hinged brackets 340 and/or bracket members 310. This may create a mechanism for lifting the supports 205' to gain access to the cargo on the first level. Still more embodiments of substructures may be additional support member 205 extrusions, that extends towards the outer perimeter of the vehicle. These extrusions may create mounting points for hammocks, hanging pots, tools, or other suitable accessories and may be selectively securable back within the perimeter of the vehicle when not in use.

Figure 9A:
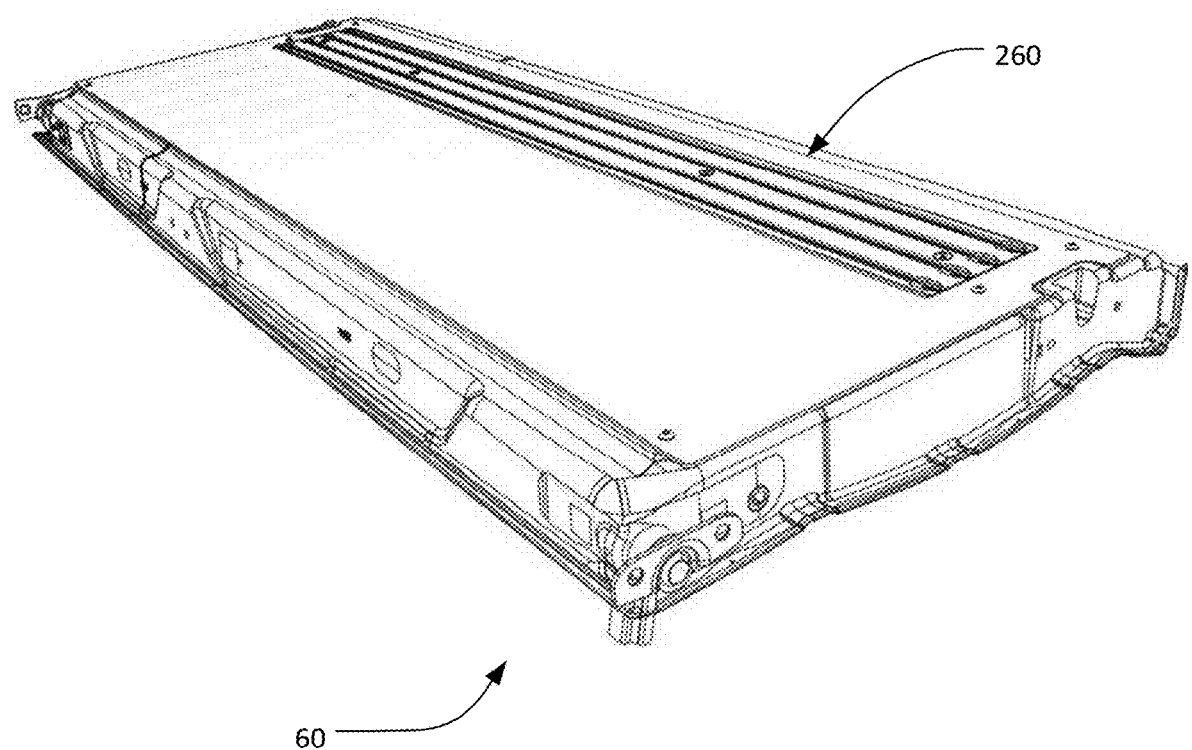
FIG. 9A is a perspective view of a rack system secured to a tailgate, according to another embodiment of the present disclosure.
Figure 9B:
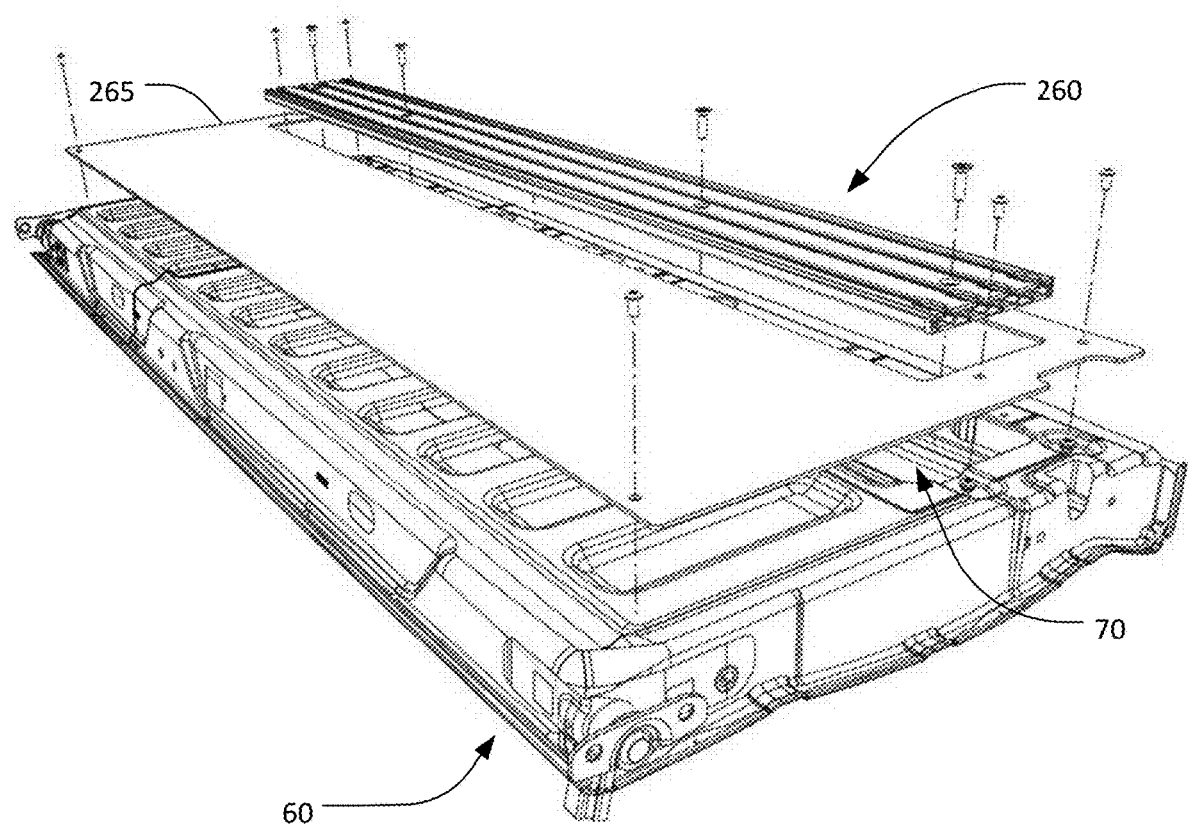
FIG. 9B is an exploded view of FIG. 9A.

In some embodiments, the system 200 may have alternate or additional structural supports 205 that reside above or below the supports 205, and/or within compartments of the vehicle itself. For example, FIGS. 9A and 9B depict a series of channels 260 embedded within a tailgate 60 of the truck bed 50, which may facilitate attachment of additional compartments for storage, additional slide out mechanisms, or cargo mounting points. The channels 260 may, for example, be secured to the tailgate 60 by being arranged between a plate 265 and a pocket 70 of the tailgate 60.

As noted above, the supports 205, 205' may be pressurized or filled with a liquid and/or gas. And to store multiple fluids and provide additional stability/rigidity, the profile 400 (FIG. 10) may have a centrally located wall 440 that separates the middle of the profile 400 into chambers 450 and 460. The chambers 450, 460 may be internally located in the profile 400 and capable of being pressurized and sealed to contain whichever contents are placed inside. For example, one or both the chambers of a particular profile 400 may be filled with pressurized air that may be usable in a vehicle tire. In these instances, the chamber 450, 460 with the pressurized air may be tapped and its contents routed to a vehicle tire when that tire experiences a flat and loses its original air. Likewise, the chambers 450, 460 may be filled with potable water which may be used as desired by the user. The artisan would understand that any suitable fluids or combination of fluids may be stored inside the chambers 450, 460.

The chambers 450, 460 may selectively contain fluids at high pressures (e.g., up to 150 PSI). The user may access the fluids in the chambers 450, 460 through, for example, one of the brackets 310 via taps 380 (FIG. 4B) (e.g., a combination of a cork gasket, a spigot, a pneumatic or hydraulic pressure fitting, etc.) associated with the support 205 and the bracket 310. Each tap 380 may include other components such as an internal check valve assembly, and/or support for pneumatic fittings (e.g., Schrader or Presta valves), such as by including a ¼-NPT threaded hole. In still more embodiments, each tap 380 may be configured to link and/or seal to another support 205 and the chambers 450, 460 therein, thus creating a network of chambers 450, 460 throughout a plurality of support 205 profiles 400. This expanded capacity may be desirable for users who wish to hold a larger volume of fluid, or who wish to accomplish a task requiring this greater capacity. In embodiments, a separate tap 380 may be provided for each of the chambers 450 and 460 such that the user may independently access the fluid stored in either chamber 450, 460 as desired.

In still further embodiments, the chambers 450, 460 may alternately or additionally be used to route cabling or wire to create electrical connections at any desired mounting point of the system 200. Routing electrical wiring in this way may allow powered connections to be created while hiding those connections inside the chambers 450, 460, while providing little to no obstruction to the use of the channels 410 for mounting options.

Embodiments of the supports 205, 205' may be fabricated from a light, strong material such as an extruded aluminum alloy. The selected material may have characteristics suitable for maintaining safe storage of whatever fluid is being stored in the chambers 450, 460. In embodiments where the supports 205, 205' are fabricated from an aluminum alloy, the user may readily shorten and modify one or more support 205, 205' dimensions (e.g., with a saw or other cutting tool) while still maintaining their functionality. Some of the supports 205, 205' may be alternately or additionally constructed with other materials, such as bent sheet metal components, while minimally affecting the primary advantages of the system 200.

In summary, the rack system 200 may employ supports 205, 205' having a profile 400 and reinforced joints 300 to facilitate an effective modular system that may relatively withstand better the forces such a storage system may experience, while providing a customizable cargo structure that a user may readily modify to suit their purposes. One of the advantages of the rack system 200 over the prior art may be the ease of assembly and disassembly of the system 200 by users in the field. Because the system 200 does not rely on permanent securing methods like welding, and instead uses temporary securing devices such as bolt or screw fasteners, the system 200 may be readily taken apart and put back together as desired.

Figure 11:
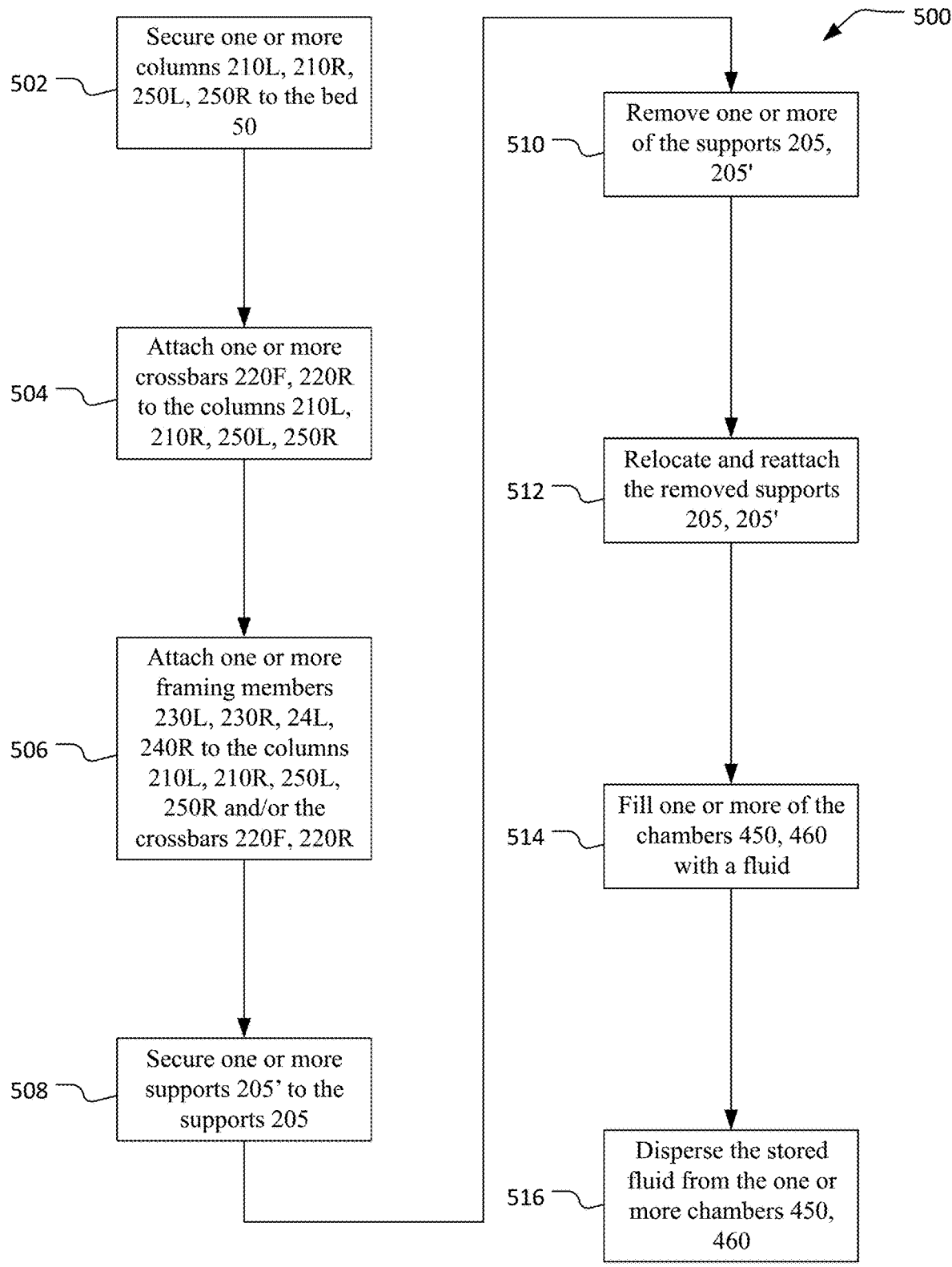
FIG. 11 is a block diagram depicting a method of assembling and modifying the rack system of FIG. 1, according to an embodiment of the present disclosure.
Figure 13A:
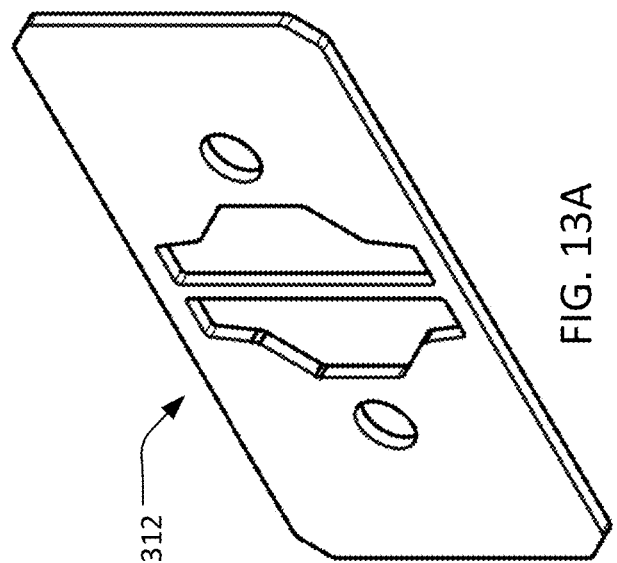
FIG. 13A is a perspective view of a spacer of the rack system of FIG. 1, according to an embodiment of the present disclosure.
Figure 13D:
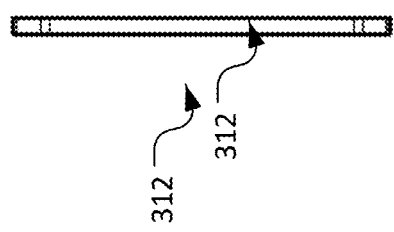
FIG. 13D is an end view of the spacer of FIG. 13A, with the opposite end view of the spacer of FIG. 13A being a mirror image.
Figure 13B:
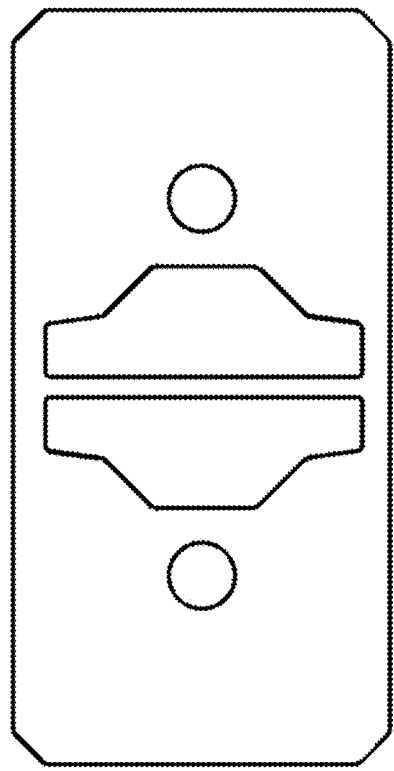
FIG. 13B is a front view of the spacer of FIG. 13A, with the rear of the spacer of FIG. 13A being a mirror image.
Figure 13C:
FIG. 13C is a side view of the spacer of FIG. 13A, with the opposite side view of the spacer of FIG. 13A being a mirror image.

FIG. 11 illustrates a method 500 for assembling and modifying embodiments of the rack system 200 on a vehicle (e.g., a bed 50 thereof). First, at step 502, the user may secure one or more columns 210L, 210R, 250L, 250R to the bed 50 via the brackets (e.g., bedrail brackets 330L, 330R, 330L', 330R'. Then, at step 504, one or more crossbars 220F, 220R may be attached to the columns 210L, 210R, 250L, 250R via the bracket members 310. At step 506, one or more framing members 230L, 230R, 24L, 240R may be attached to the columns 210L, 210R, 250L, 250R and/or the crossbars 220F, 220R using a plate 350, an anchor 360, a brace 370, or a combination thereof. One or more further supports 205' (e.g., columns 210L', 210R', 240L', 240R', crossbars 220F', 220R', and framing members 230L', 230R') may secured to the supports 205 via hinged joints 340 and/or bracket members 310, at step 508.

The user may decide that the current configuration of the rack system 200 is insufficient, or the cargo task at hand may change. Thus, the user, at step 510, may decide to remove one or more of the supports 205, 205'. For instance, the user may detach one or more of the framing members 240L, 240R from the crossbars 220F, 220R. Then, at step 512, the user may reattach (e.g., using the plates 350, anchors 360, and/or braces 370) the previously detached support 205, 205' at a different location along the supports 205, 205'. Continuing the earlier example, the user may reattach (e.g., using anchors 360 and braces 370) the one or more framing members 240L, 240R to the crossbars 220F, 220R where they previously were not located.

At step 514, the user may fill one or more of the chambers 450, 460 of the various support 205, 205' profiles 400 with a fluid, such as pressurized air for filling vehicle tires or potable water. Using the one or more taps 380, at step 516, the user may then drain at least some of the fluid in the chambers 450, 460 to accomplish a task such as filling the air in a flat vehicle tire.

The artisan would understand the steps of method 500 may be readily added to, omitted, and/or modified as is suitable to encompass the embodiments of the rack system described herein. For example, the step of adding anchors 360 to allow for the securement of accessories to system 2000 may be added to the method 500. As another example, the step of removing a support 205, 205' to better suit a new cargo task may be added to the method 500.

The artisan would understand that the embodiments of the rack system 200 may allow users to create structures for any suitable vehicle, such pickup beds, SUV's, side by side recreational vehicles, and other similar vehicles, in an array of configurations to meet the end user needs for cargo organization. The artisan would also understand that components of the system 200, such as the joints 300, may vary in design to allow for different widths and configurations of vehicles. For example, the system 200 may be modified such that will create the system may be assembled over the top of a "tonneau" cover or other soft topper product (i.e., the system 200 may effectively extend over the outer limits of a "tonneau" cover, and may be secured thusly with little to no interference).

Having described embodiments of a modular vehicle mounted cargo rack system, it is believed that other modifications, variations and changes may be suggested to those skilled in the art in view of the teachings set forth herein. It is understood that all such variations, modifications and changes are believed to fall within the scope of the present disclosure. Thus, as has been described, the rack system concepts disclosed herein may serve to minimize traditional cargo system issues, and in so doing, provide a rack system that is relatively more flexible. Moreover, the rack system concepts disclosed herein may provide for a system that is more reliable and may provide further functionalities in addition to retaining cargo, such a fluid storage within the cargo rack supports.

The artisan will understand that the rack system embodiments disclosed herein may include or have associated therewith electronics (e.g., wires, taillights, floodlights, gas pressure level sensors, et cetera). The electronics may be used to control and/or modify the operation of the various rack systems (e.g., to provide illumination, to output an alert in response to a sensor detection, et cetera). In some example embodiments, processor or processors used may be configured through particularly configured hardware, such as an application specific integrated circuit (ASIC), field-programmable gate array (FPGA), etc., and/or through execution of software to allow the various electronics to function in accordance with the disclosure herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be completed in the specific order described.

The invention claimed is:

1. A vehicle rack system, comprising:
   a first column having a first end and a second end, the first end of the first column being operably coupled to the vehicle;
   a crossbar having a first end and a second end;
   a first bracket assembly coupling the second end of the first column to the first end of the crossbar, the first bracket assembly having a first fastener passing into the first column through the second end of the first column, the first bracket assembly having a second fastener passing into the crossbar through the first end of the crossbar;
   a second column having a first end and a second end, the first end of the second column being operably coupled to the vehicle;
   a second bracket assembly coupling the second end of the second column to the second end of the crossbar;
   an anchor; and
   a support plate coupled to the first column and to the crossbar, the first bracket being seated in the support plate when the system is at an assembled configuration;
   wherein at least one item selected from the group consisting of the first column, the second column, and the crossbar includes a longitudinal slot between and behind a pair of flanges; and wherein the anchor is positioned in a respective said longitudinal slot, the anchor being irremovable from the respective said longitudinal slot while the system is at the assembled configuration, the anchor being removable from the respective said longitudinal slot while the system is at an unassembled configuration.

2. The vehicle rack system of claim 1, wherein:
the first column includes the longitudinal slot;
the anchor is positioned in the longitudinal slot of the first column;
the crossbar includes a longitudinal slot between and behind a pair of flanges;
a second anchor is positioned in the longitudinal slot of the crossbar, the second anchor being irremovable from the longitudinal slot of the crossbar while the system is at an assembled configuration, the second anchor being removable from the longitudinal slot of the crossbar while the system is at an unassembled configuration;
the support plate is coupled to the first column using the anchor; and
the support plate is coupled to the crossbar using the second anchor.

3. The vehicle rack system of claim 2, wherein the support plate includes at least one hole for use as a tie down point.

4. The vehicle rack system of claim 1, further comprising a nozzle, and wherein:
at least one item selected from the group consisting of the first column, the second column, and the crossbar includes a lumen for holding a fluid therein; and
the nozzle selectively allows the fluid to enter and exit the lumen.

5. The vehicle rack system of claim 4, wherein:
the lumen is bifurcated into first and second portions;
the nozzle allows the fluid to enter and exit the first portion of the lumen;
another nozzle selectively allows a second fluid to enter and exit the second portion of the lumen.

6. The vehicle rack system of claim 5, wherein the second fluid is different from the fluid.

7. The vehicle rack system of claim 4, wherein the lumen is located in a central area of the crossbar and extends longitudinally from the first end of the crossbar toward the second end of the crossbar.

8. The vehicle rack system of claim 7, wherein a seal forms a pressure tight end of the lumen at the second end of the crossbar.

9. The vehicle rack system of claim 1, further comprising a spacer between the first bracket assembly and an item selected from the group consisting of the second end of the first column and the first end of the crossbar.

10. The vehicle rack system of claim 1, further comprising:
a first spacer between the first bracket assembly and the second end of the first column; and
a second spacer between the first bracket assembly and the first end of the crossbar;
wherein the first bracket assembly has a first substantially planar face and a second substantially planar face, the second substantially planar face being angularly offset relative to the first substantially planar face;
wherein the first spacer abuts the first substantially planar face; and
wherein the second spacer abuts the second substantially planar face.

11. The vehicle rack system of claim 1, further comprising an accessory, and wherein the accessory is removably coupled to the anchor.

12. The vehicle rack system of claim 11, wherein the accessory is at least one item selected from the group consisting of a cargo mounting point, a modular plate, a toolbox, a tie down ring, a cargo pods, a gas tank, a water tank, a roof top tent, a bike carrier, a kayak carrier, a canoe carrier, a ladder, a tool, an axe, a shovel, a hi-lift, and a spare tire.

13. A vehicle rack system, comprising:
a first column having a first end and a second end, the first end of the first column being operably coupled to the vehicle;
a crossbar having a first end and a second end;
a first bracket assembly coupling the second end of the first column to the first end of the crossbar, the first bracket assembly having a first fastener passing into the first column through the second end of the first column, the first bracket assembly having a second fastener passing into the crossbar through the first end of the crossbar;
a second column having a first end and a second end, the first end of the second column being operably coupled to the vehicle;
a second bracket assembly coupling the second end of the second column to the second end of the crossbar;
an anchor; and
a nozzle;
wherein at least one item selected from the group consisting of the first column, the second column, and the crossbar includes a longitudinal slot between and behind a pair of flanges;
wherein the anchor is positioned in a respective said longitudinal slot, the anchor being irremovable from the respective said longitudinal slot while the system is at an assembled configuration, the anchor being removable from the respective said longitudinal slot while the system is at an unassembled configuration;
wherein at least one item selected from the group consisting of the first column, the second column, and the crossbar includes a lumen for holding a fluid therein; and
wherein the nozzle selectively allows the fluid to enter and exit the lumen.

14. The vehicle rack system of claim 13, wherein:
the lumen is bifurcated into first and second portions;
the nozzle allows the fluid to enter and exit the first portion of the lumen;
another nozzle selectively allows a second fluid to enter and exit the second portion of the lumen.

15. The vehicle rack system of claim 14, wherein the second fluid is different from the fluid.

16. The vehicle rack system of claim 13, wherein the lumen is located in a central area of the crossbar and extends longitudinally from the first end of the crossbar toward the second end of the crossbar.

17. The vehicle rack system of claim 16, wherein a seal forms a pressure tight end of the lumen at the second end of the crossbar.

18. The vehicle rack system of claim 13, further comprising a spacer between the first bracket assembly and an item selected from the group consisting of the second end of the first column and the first end of the crossbar.

19. The vehicle rack system of claim 13, further comprising:
a first spacer between the first bracket assembly and the second end of the first column; and
a second spacer between the first bracket assembly and the first end of the crossbar;

wherein the first bracket assembly has a first substantially planar face and a second substantially planar face, the second substantially planar face being angularly offset relative to the first substantially planar face;

wherein the first spacer abuts the first substantially planar face; and wherein the second spacer abuts the second substantially planar face.

20. The vehicle rack system of claim 13, further comprising an accessory, wherein the accessory is removably coupled to the anchor, and wherein the accessory is at least one item selected from the group consisting of a cargo mounting point, a modular plate, a toolbox, a tie down ring, a cargo pods, a gas tank, a water tank, a roof top tent, a bike carrier, a kayak carrier, a canoe carrier, a ladder, a tool, an axe, a shovel, a hi-lift, and a spare tire.

* * * * *